Nov. 1, 1955     L. E. CALDWELL     2,722,130
MOLDED LAMINATED PULLEY AND METHOD OF MAKING SAME

Filed April 13, 1953     2 Sheets-Sheet 1

WITNESSES:

INVENTOR
Lewis E. Caldwell.
BY
ATTORNEY

United States Patent Office 2,722,130
Patented Nov. 1, 1955

2,722,130

MOLDED LAMINATED PULLEY AND METHOD OF MAKING SAME

Lewis E. Caldwell, Greensburg, Pa., assignor to Westinghouse Electric Corporation, East Pittsburgh, Pa., a corporation of Pennsylvania Application April 13, 1953, Serial No. 348,461

5 Claims. (Cl. 74—230.7)

This invention relates to molded pulleys and a method of making the same.

In aircraft and the like, it is the practice to operate the control wires over molded fiber-reinforced resinous pulleys. These pulleys are produced by a number of various methods. One method used extensively in the trade is molding a macerated, resin impregnated fibrous material into a pulley body with the cable groove either being molded therein or being later machined in the molded body. An alternative method utilized is to mold a pulley body from a wound coil preform of resin impregnated fibrous strip material and machining a cable groove in the molded body. Pulleys are also produced by machining them from molded flat stock laminated plate.

The pulleys produced by these methods give satisfactory results within restricted load limits but the full strength of the reinforcing fibers is not realized because they are not so aligned as to develop their maximum strength. In other words, there is no attempt to align the fibers so that a maximum number of them are parallel to the surface being stressed.

In the pulleys molded of macerated material, the fibrous particles tend to "shingle" as they are compressed in molding, instead of interlocking, and thus approach the inferior strength characteristics of edgewise laminates when they are stressed perpendicular to the direction of the molding pressure. The laminated pulleys have an alignment of fibers, but the direction of this alignment is opposite of that required for maximum strength.

During the operation of conventionally molded pulleys, the stresses applied by a cable in the cable groove are greatest at the weakest parts of the structure, namely the bond between laminations and this is the case at the bottom of the lips forming the groove for the cable. It is well known that the edgewise strength of laminates is lower than their flatwise strength. With the continuous trend to larger and heavier aircraft, the pulleys used are required to withstand loads greater than the pulleys produced by prior art methods can handle.

An object of this invention is to provide a molded pulley having reinforcing fibers or laminations positioned in a predetermined position so as to achieve greater mechanical strength in the pulley than obtained heretofore.

A further object of this invention is to provide a method of molding a laminated pulley wherein impregnated fibrous material is pre-shaped so as to direct the orientation thereof during the molding operation, into concentric laminations defining a cable groove, thereby more fully utilizing the strength of the reinforcing fibers.

Other objects of this invention will become apparent from the following description, when taken in conjunction with the accompanying drawing, in which.

Figure 1:
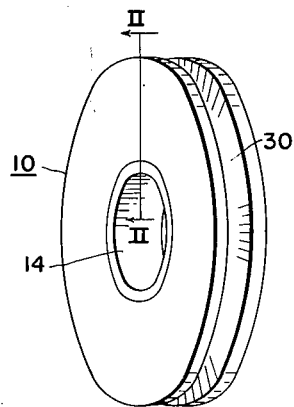
Figure 1 is a perspective view of a molded pulley.
Figure 2:
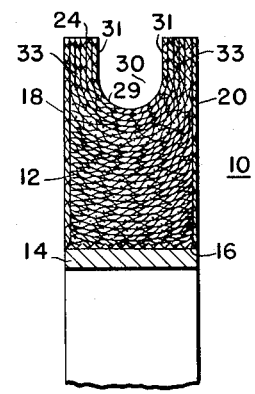
Fig. 2 is an enlarged fragmentary sectional view taken on the line II—II of Fig. 1.

Referring to Figs. 1 and 2 of the drawing, the pulley 10 is provided with a web 12 of fibrous material impregnated with a phenol-aldehyde, urea-aldehyde, or other thermosettable condensation resin. The pulley web 12 is molded under heat and pressure over a metal bushing 14 having a knurled outer surface 16 to give a mechanical interlock with the molded material. In order to provide the finished pulley with an improved appearance and some additional strength, facing sheets 18 and 20 are molded on each side of the web 12.

It is to be understood that the metal bushing 14 is not an essential component of the pulley 10. The web 12 may be molded so that its inner wall acts as a bushing, thus eliminating the metal bushing 14. The inner wall, if desired, may be impregnated with a suitable lubricating mineral compound such as graphite or molybdenum disulfide.

Figure 4:
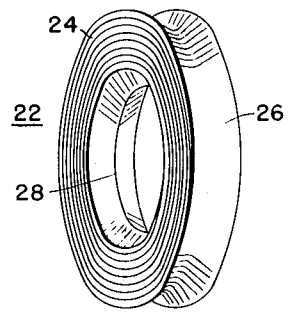
Fig. 4 is a perspective view of a spirally wound preform prepared in accordance with this invention.
Figure 5:
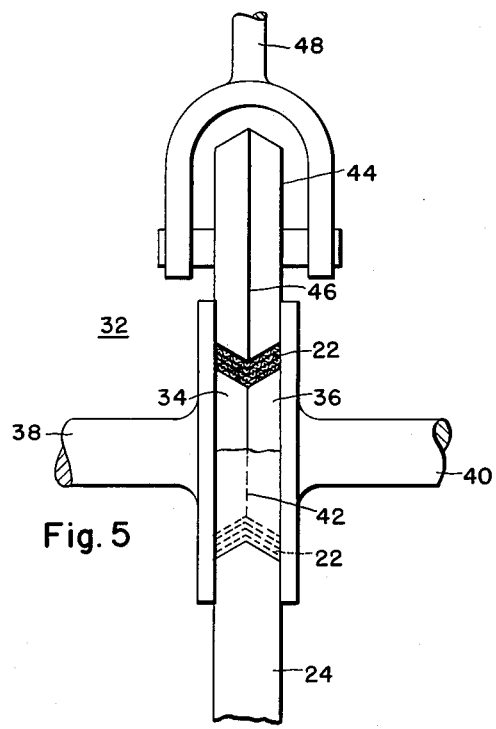
Fig. 5 is a frontal elevation, partly in section, of a winding mechanism for making preforms.

In producing the pulley of this invention, a peripherally grooved coiled preform 22 is prepared, as illustrated in Fig. 4, by spirally winding under tension, into superimposed layers, a continuous strip 24 of fibrous material previously impregnated with a condensation resin advanced to the B-stage. This may be accomplished on a machine as illustrated in Fig. 5, wherein the strip 24 as it is wound into the preform 22, is shaped by being drawn in contact with a forming roller 44 having a V-shaped peripheral surface, thereby imparting to it a substantially V-shaped cross section. This preform winding mechanism will be hereinafter described. The strip 24 is wound so that it has a peripheral groove 26 and the apex of the V extends in the direction of the axis of the preform 22 that is being prepared. It will be understood that the peripheral groove 26 may be rounded or V-shaped. This preform has an aperture 28.

The preform 22 is wound on a suitable winding mechanism 32 such as illustrated in Fig. 5. The winding mechanism 32 comprises a pair of axially separable complementary truncated-cone shaped members 34 and 36 mounted on rotatable shafts 38 and 40 respectively, forming a rotatable mandrel 42 having a V-shaped peripheral groove on which the preform 22 is wound. Cooperating with the mandrel 42 and its V-shaped peripheral groove is a complementary forming roller 44 having a V-shaped peripheral surface 46. The roller 44 is pressed in a direction toward the groove in mandrel 42 by means of a suitable spring or air compressor (not shown) connected to arm 48.

In operation, shafts 38 and 40 are rotated by a suitable drive means (not shown) and resin impregnated strip 24 is wound under tension over the mandrel 42. Strip 24 is forced in the V-shaped peripheral groove in the mandrel 42 by the complementary forming roller 44, thereby imparting a substantially V-shaped cross section to the strip 24, as it is spirally wound into interfitting layers making up the preform 22.

When a preform 22 of desired size has been wound, the strip 24 is cut at a desired point, the forming roller 44 is lifted and either shaft 38 or 40 is moved axially, thereby separating cone members 34 and 36 and allowing the removal of the completed preform from the mandrel.

It will be understood that other mechanisms for producing a peripherally grooved preform may be employed.

In the process of molding, the bushing 14 is placed in aperture 28 of preform 22 and the assembly is positioned in a mold having a circular tongue of desired configuration fitting into the peripheral groove 26 of the preform and encircling the preform body 22 to form a cable groove 30 in the molded pulley. The configuration of the tongue is designed to accommodate the type and size of cable the pulley is intended to work with. The tongue is generally U-shaped in cross-section to provide the cable groove 30 having a semi-circular bottom 29 and vertical sides 31 to fit a cable that is round in cross-section. The cable groove 30 is generally molded undersize, and later machined to size to provide a more perfect groove that will have better wear characteristics.

As illustrated in Fig. 2 of the drawing, the molding tongue buckles the preshaped strips 24 in such a manner that the fibrous laminations will be oriented to lie concentrically about cable groove 30 so that the laminations are generally parallel to the sides of the groove 30. In this manner, a high proportion of the maximum strength of the fibers is utilized, as the laminations are aligned to the forces that are applied in the operation of a pulley.

The primary stresses encountered in the operation of a pulley are in a line through the body of the pulley perpendicular to the rotational axis thereof and at flanges 33 of the cable groove, generally in a line parallel to the same rotational axis. The tolerances of these stresses are expressed herein in terms of sheave strength and flange strength respectively.

Sheave strength can be defined as the load required to rupture a pulley when it is supported on a pin through its center or bearing and loaded by means of a cable, wrapped to any desired angle of contact in the cable groove, and then subjected to tension.

Flange strength can be defined as the load required to rupture the flange 33 of the cable groove when a cable is in contact with the pulley for a very small or zero angle of wrap with the cable in tension and misaligned with the pulley.

Figure 3:
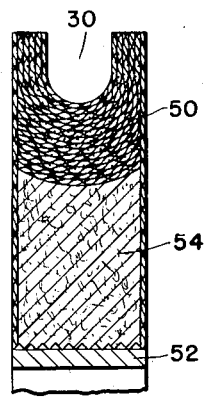
Fig. 3 is an enlarged fragmentary sectional view similar to Fig. 2, but illustrating a modification.

Illustrated in Fig. 3 of the drawing is a modification of a pulley produced in the same manner as the pulley illustrated in cross-section in Fig. 2, and described hereinabove, except that there is disposed between an outer circumferential V-shaped preform portion 50 and a bushing 52, a quantity of macerated impregnated fibrous material 54. This is accomplished by compressing the macerated resinous impregnated fibrous material 54, while the resin is still in the B-stage, into a preform that is adapted to fit over the bushing 52. A spirally wound coil preform of the type described hereinbefore and illustrated in Fig. 4, is fitted over the macerated preform to provide the outer circumferential portion 50. This assembly is placed in a mold and consolidated under heat and pressure to form a composite pulley. The construction of Fig. 3 is utilized for reasons of economy when pulleys of larger size are being produced. As a result, it is not necessary to wind continuous fabric strip into a preform of a size sufficient to make up the complete web portion, but merely the outer circumferential portion where the cable stresses incurred are greater.

Figure 6:
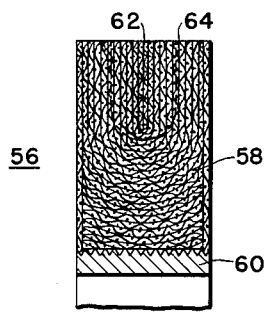
Fig. 6 is an enlarged fragmentary sectional view similar to Fig. 2 and Fig. 3, but illustrating a modification of a pulley blank.

Illustrated in Fig. 6 of the drawing is a cross-section of a pulley blank 56 from which pulleys of the type illustrated in either Fig. 2 or Fig. 3 may be produced. A preform 58 with a V-shaped peripheral groove is molded over a bushing 60 in the same manner as described hereinbefore for producing the pulley illustrated in cross-section in Fig. 2, except that there is no circular tongue in the mold to form a cable groove such as the cable groove 30 shown in Fig. 2. Instead, as shown in Fig. 6, the outermost peripheral layer 62 of the preform 58 is completely folded together with adjoining layers being folded therewith to a progressively lesser degree, thus producing a solid peripheral rim without a groove such as previously existed in the preform 58. A cable groove of desired size and shape is later machined in the pulley blank 56 as indicated by the dashed lines 64. In the final pulley, the laminations are disposed to produce a stronger pulley than previously available.

It has been found desirable, but not entirely necessary, in making the preform to use high frequency heating of the material 24 to facilitate the winding of the preform 22, to control the degree of set of the resin prior to molding and also to use high frequency current to preheat the material just prior to molding to shorten the cure cycle and to aid in moving the material properly during the pressing or closing of the mold. Other types of preheating can be used for the same purposes instead of high frequency heating.

Similar standard pulleys constructed in accordance with my invention have shown an increase of sheave strength to a minimum of 5900 p. s. i. as compared with a minimum of 3500 p. s. i. in pulleys constructed in accordance with the best known prior art methods. The pulleys of this invention have a flange strength of a minimum of 340 p. s. i. whereas 210 p. s. i. was the maximum obtainable using best known prior art construction methods.

The pulley shown in Fig. 1, the sectional views shown in Fig. 2 and Fig. 3, and the sectional view of the pulley blank in Fig. 6 are illustrations after removal from the mold. As a consequence, the edges or corners of the pulleys are square. It is a general practice to radius or round off these edges by machining in order to improve appearance and to facilitate ease in handling of the finished pulleys.

Since certain changes in carrying out the above invention may be made without departing from the scope thereof, it is intended that all matter contained in the above description shall be interpreted as illustrative and not in a limiting sense.

I claim as my invention:

1. In a composite pulley, the combination comprising, a bushing, a web formed of fibrous material impregnated with a condensation resin extending radially outwardly from the bushing, the web having an outer, circumferential portion comprising superimposed layers of spirally wound continuous fibrous strip impregnated with a thermoset resin, a continuous recess in the periphery of the outer circumferential portion providing a cable groove, the cable groove being defined by substantially concentric layers of the spirally wound fibrous strip, the impregnated fibrous material being consolidated and hardened into an integral mass with the bushing.

2. The combination of claim 1 in which the spirally wound continuous fibrous impregnated strip extends from the periphery of the outer circumferential portion to the bushing.

3. The combination of claim 1 in which there is disposed between the bushing and the spirally wound continuous fibrous strip, macerated impregnated fibrous material.

4. In the method of making a composite molded pulley, the steps comprising winding under tension a continuous strip of fibrous material in substantially V-shaped cross-section, said fibrous material being impregnated with a condensation resin, thereby to provide a preform having superimposed interfitting spirally wound layers, the strip being wound in such a manner that the apexes of the V-shaped cross sections in the interfitting layers of strip extend in the direction of the axis of the preform and the preform having a V-shaped peripheral groove, placing the preform in a mold having a tongue of desired configuration encircling the preform and adapted to fit in the V-shaped groove in the periphery thereof, said tongue serving to form a cable groove, applying heat and pressure to the mold to consolidate and harden the preform and produce a cable groove defined by substantially concentric layers of the spirally wound fibrous strip.

5. In the method of making a composite molded pulley, the steps comprising winding under tension a continuous strip of fibrous material in substantially V-shaped cross-section, said fibrous material being impregnated with a condensation resin, thereby to provide a coiled preform having superimposed interfitting spirally wound layers, the strip being wound in such a manner that the apexes of the V-shaped cross-sections extend in the direction of the coil axis of the preform, thereby forming a peripheral groove in the preform, placing the preform in a mold and applying heat and pressure to the mold, first to fold the interfitting layers in such a manner that the peripheral groove in the preform is filled by the folding together of the outermost layers of the preform, and then to consolidate and harden the preform, and thereafter machining a continuous recess in the periphery of the hardened preform to provide a cable groove.

References Cited in the file of this patent

UNITED STATES PATENTS

| | | |
|---|---|---|
| 1,370,024 | Kempton | Mar. 1, 1921 |
| 1,769,950 | Hensley | July 8, 1930 |
| 1,852,824 | Schroeder | Apr. 5, 1932 |
| 2,172,921 | Bacon | Sept. 12, 1939 |
| 2,198,831 | Moyer | Apr. 30, 1940 |
| 2,300,760 | Amigo | Nov. 3, 1942 |
| 2,315,301 | Van Deventer 3d, et al. | Mar. 30, 1943 |
| 2,416,197 | Moyer et al. | Feb. 18, 1947 |